United States Patent [19]

Fogg

[11] 4,297,776
[45] Nov. 3, 1981

[54] LEAF SPRING PULLER FOR NUCLEAR FUEL RODS

[75] Inventor: James L. Fogg, Columbia, S.C.

[73] Assignee: Westinghouse Electric Corp., Pittsburgh, Pa.

[21] Appl. No.: 28,140

[22] Filed: Apr. 9, 1979

[51] Int. Cl.³ .......................................... B23P 19/04
[52] U.S. Cl. ..................................... 29/252; 29/259; 29/263
[58] Field of Search .................. 29/252, 263, 258–262; 294/90, 86 AU; 254/18

[56] References Cited

U.S. PATENT DOCUMENTS

| | | | |
|---|---|---|---|
| 1,141,742 | 6/1915 | Wiseman | 254/18 |
| 1,632,720 | 6/1927 | Worster | 29/262 |
| 1,801,984 | 4/1931 | Schafer | |
| 2,924,483 | 2/1960 | Koch et al. | 294/86 R |
| 3,266,835 | 8/1966 | Hall et al. | 294/86.24 |
| 3,604,746 | 9/1971 | Notari | 294/90 |
| 3,857,599 | 12/1974 | Jones et al. | 294/90 |
| 3,905,634 | 9/1975 | Johnson et al. | 294/86 A |
| 4,059,883 | 11/1977 | Osborne | 29/259 |

FOREIGN PATENT DOCUMENTS

| | | | |
|---|---|---|---|
| 1078959 | 3/1960 | Fed. Rep. of Germany | 29/259 |
| 1190100 | 3/1959 | France | |
| 1363432 | 5/1964 | France | |
| 375317 | 10/1939 | Italy | 29/252 |
| 286952 | 11/1952 | Switzerland | 29/262 |

Primary Examiner—Robert C. Watson
Attorney, Agent, or Firm—J. R. Campbell; Z. L. Dermer

[57] ABSTRACT

A fuel rod puller in the form of a collet for pulling fuel rods from a storage area into grids of a nuclear reactor fuel assembly. The rod puller moves longitudinally through the grids to a storage area where projections on the end of leaf springs grasp onto an end plug in a fuel rod. Drive apparatus then pulls the rod puller and connected fuel rod from the storage area into the fuel assembly grids. The rod puller includes an outer tube having leaf springs on one end thereof in one modification, mounted within the outer tube is a movable plunger which acts to urge the leaf springs outwardly to a position to permit passing or with the end of a end plug. Upon withdrawal of the plunger, the leaf springs move into a groove formed in the end of a fuel rod end plug, and the fuel rod subsequently is pulled into the fuel assembly grids. In another modification, the leaf springs on the outer rod are biased in an outward direction and a longitudinally movable tube on the outer rod is moved in a direction to contract the leaf springs into a position where the projections thereof engage the groove formed in a fuel rod end plug.

6 Claims, 7 Drawing Figures

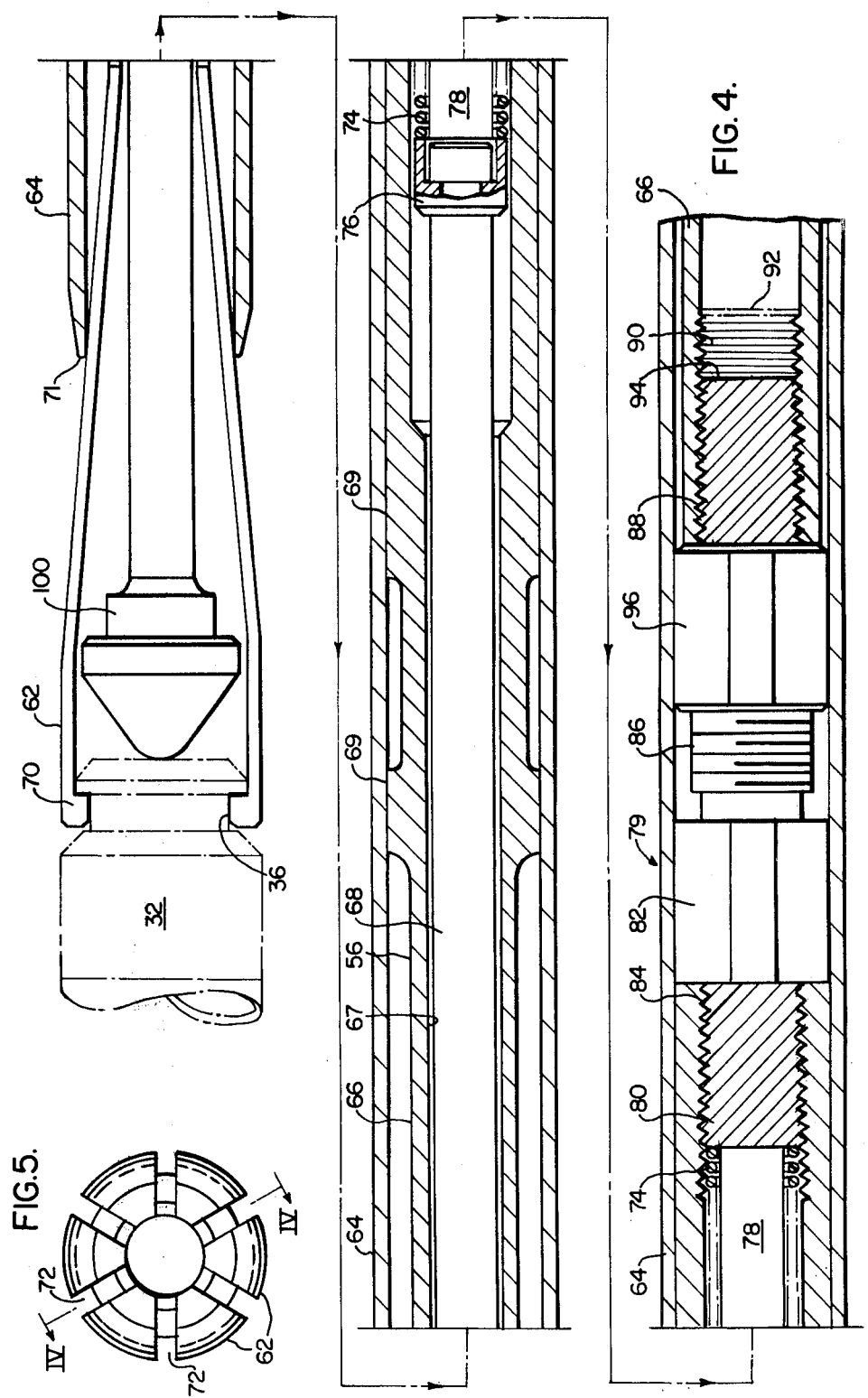

LEAF SPRING PULLER FOR NUCLEAR FUEL RODS

BACKGROUND OF THE INVENTION

The invention described herein relates to a leaf spring type of collet especially designed for pulling fuel rods into grids spaced along the length of a nuclear reactor fuel assembly.

A typical fuel assembly for a nuclear reactor includes a square array of fuel rods held in spaced relationship with each other by a series of grids of egg crate configuration placed along the fuel assembly length. Each cell in the egg crate grid holds a fuel rod and the four walls of each cell contain springs and projections which hold the rod in a set axial position. Since the springs and projections present substantial resistance to the insertion of fuel rods into the grids, special designs of fuel rod pullers are used to pull the rods into the grid cells at the time of assembly.

In prior designs, this has been accomplished by manually connecting the end of a pull rod to an externally grooved end plug of particular design welded in the end of a fuel rod. The connector between the pull rod and end plug is formed with two semi-cylindrical mating shells having an internally projecting flange located on each end which fit into complementary grooves respectively formed on an end of the fuel rod end plug and on an end of the fuel rod puller. The shell diameter is the same as the outer diameter of the fuel rod thus facilitating the drawing of a feul rod into its cell in the fuel assembly grid.

The major disadvantage of this prior art design is that it is inefficient. The operator positions both halves of the shell connector on adjacent ends of the fuel rod and rod puller and then pulls the fuel rod in a direction to create a friction fit and thus hold the shell halves on the fuel rod and rod puller. Although this manual action is in itself simple and capable of being quickly done, it nevertheless still involves an expensive labor operation because of the large number of fuel rods to be pulled into an assembly. A 17 by 17 fuel assembly will contain slightly over 200 fuel rods thus requiring more than 200 separate operations in preparing the fuel rods for loading into the assembly grids. After each fuel rod is pulled into its cell in the grid, the shell halves must be removed thus almost doubling the amount of labor time necessary to effect assembling the fuel assembly. It therefore is apparent that the need exists for an improved design of fuel rod puller which will act automatically not only to pull a fuel rod into a fuel assembly but also return it to its starting point without engaging in any substantial kind of manual effort in carrying out this part of the loading process.

SUMMARY OF THE INVENTION

Briefly stated, the above disadvantages of the prior art are overcome by this invention by providing a fuel rod puller in the form of a collet having leaf springs designed to encompass and to engage a fuel rod end plug prior to pulling the fuel rod into a fuel assembly grid. The fuel rod puller includes a hollow cylindrical housing having an actuating member thereon designed to cause the leaf springs to be moved outwardly to an open position to enable the ends of the springs to grasp the end of a fuel rod end plug. All of the peller components are incorporated in a long cylindrical tube having a diameter no greater than the outside diameter of a fuel rod thus providing a smooth surface with no obstructions thereon for facilitating the movement of the fuel rod puller and a fuel rod into a fuel assembly grid.

BRIEF DESCRIPTION OF THE DRAWINGS

While the specification concludes with claims particularly point out and distinctly claiming the subject matter of the invention, it is believed the invention will be better understood from the following description taken in connection with the accompanying drawings wherein:

FIG. 4 is a view taken on lines 4—4 of FIG. 5 and illustrating the design of a modified form of pull rod;

FIG. 5 is an end view of the pull rod illustrated in FIG. 4; and

DESCRIPTION OF THE PREFERRED EMBODIMENT

Figure 1:
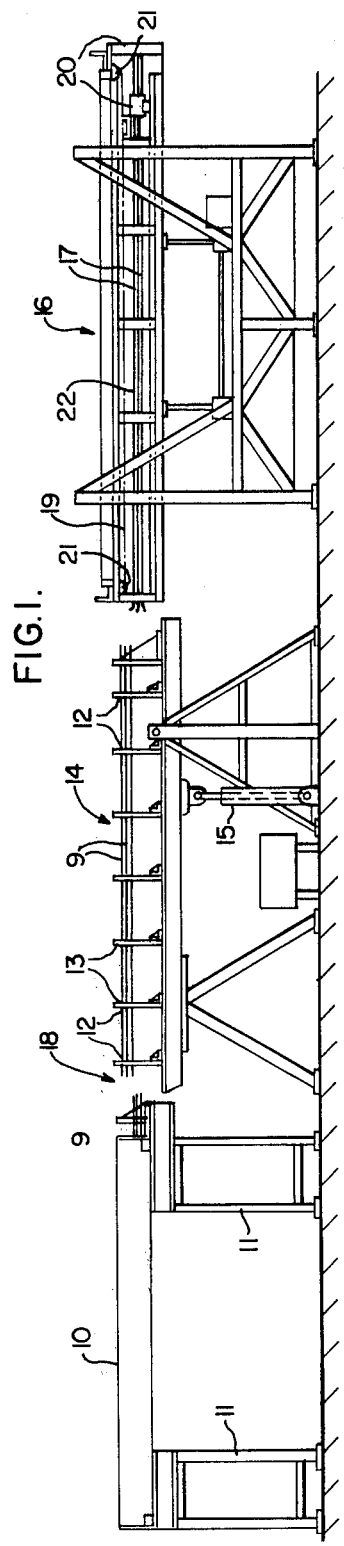
FIG. 1 is a view in elevation generally illustrating the components used for pulling a fuel rod from a storage container into grids for a nuclear reactor fuel assembly.
Figure 1A:
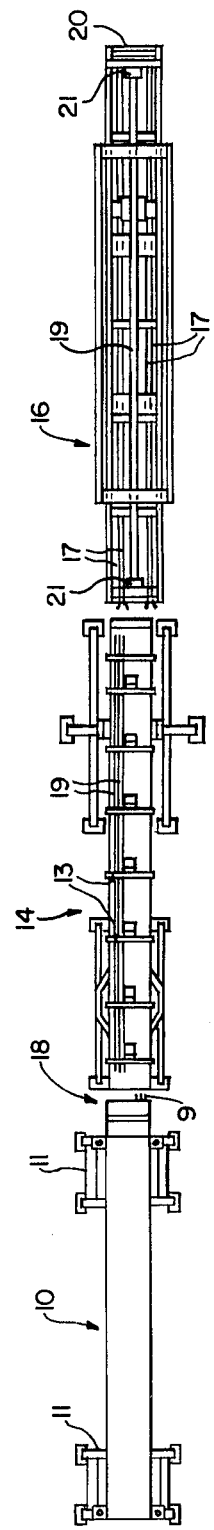
FIG. 1A is a plan view of FIG. 1.

Referring now to the drawings wherein like reference characters designate like or corresponding parts throughout the several views, there is shown in FIGS. 1 and 1A, a general arrangement of components used in pulling fuel rods into grids for a nuclear reactor fuel assembly. A container 10 supported by a framework 11 is of square cross-section and holds a supply of fuel rods 9 already loaded with fuel pellets and sealed at both ends. The rods are stored therein and are positioned to be pulled into grids 12 of a fuel assembly. Although the fuel rods may vary in length from reactor to reactor, a conventional size of a fuel rod may be 0.345 inches diameter and 16 feet long and the storage container therefore is accordingly made to about this length. The intermediate fuel assembly section 14 includes multiple fixtures 13 each of which holds a conventional grid 12 of egg crate configuration having multiple axially extending openings or cells (not shown) into which the fuel rods are adapted to be pulled. Each cell in the grids includes springs and projections of well-known design which serve to hold all fuel rods in spaced relationship with each other along their total length. A hydraulically operated ram 15 acts to elevate one end of the fuel assembly section 14 after all the fuel rods are loaded in their grids, to a position to permit removal of the completed fuel assembly from its fixture.

The fuel rod puller section 16 is supported on a framework and is designed to hold multiple rod pullers 17, one for each fuel rod in a particular row, which are arranged to be moved from their housed position in section 16, through the grids 12 in section 14 and into the latching position indicated 18. A drive mechanism 20 including a wire rope 19 engaged with pulleys 21, is connected to the ends of multiple or single rod pullers 22, and the arrangement is effective in laterally moving the rod pullers 17 back and forth through the cells in grids 12. When an end of a pull rod is moved to the position 18, it is latched onto the end of a fuel rod and subsequently pulled into the grids 12. Each of the sections 10, 14 and 16 are about 16 feet long and these three sections are therefore needed to effect the insertion or installation of fuel rods into the center section 14 which contains the fuel assembly grids.

At the time of loading, multiple or a single rod puller is moved by a drive mechanism 20 from its position in section 16 into and through the cells in grids 12 to the position 18. The rod puller of this invention is then caused to latch onto an end of the fuel rod, and the power mechanism 20 is energized to pull the fuel rod into its corresponding cell in the grid. Although the above description has been made in relation to a single rod puller and fuel rod, the actual design of section 16 and the drive mechanism 20 is such that multiple rod pullers are moved to the position 18, and each of these is then latched onto a fuel rod end plug. Multiple fuel rods 9 are then simultaneously pulled into the grids 12 as shown in FIGS. 1 and 1A. After all fuel rods are loaded therein, the resultant construction comprises a fuel assembly almost ready to be loaded into a nuclear reactor.

Figure 2:
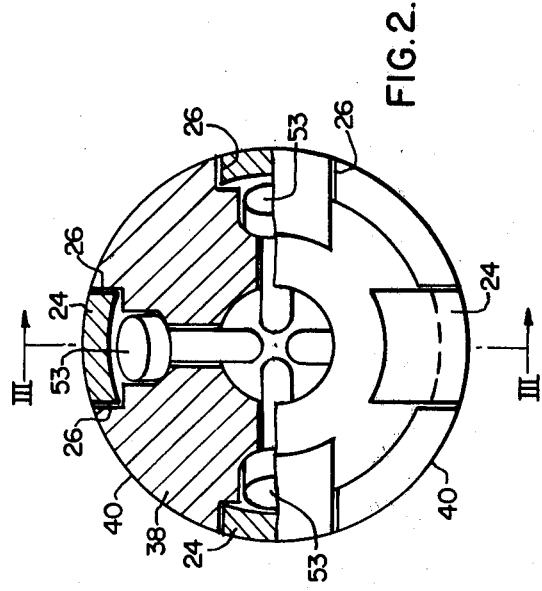
FIG. 2 is a view in elevation, partly in section, taken on lines 2—2 of FIG. 3.
Figure 3:
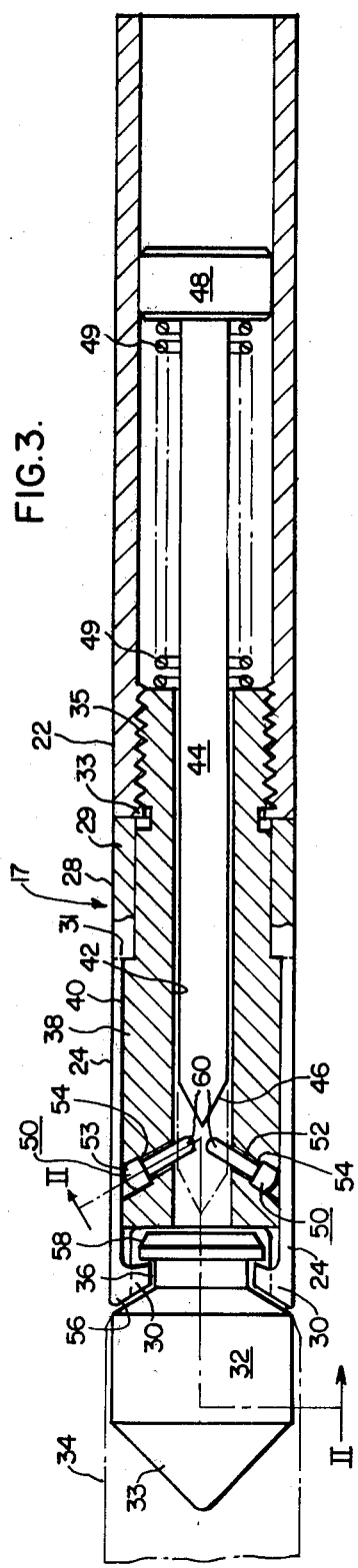
FIG. 3 is a longitudinal sectional view taken on lines 3—3 of FIG. 2.

Referring to FIGS. 2 and 3, the fuel rod puller includes an outer pull rod 22 of cylindrical configuration and having a diameter preferably less than a fuel rod, e.g., 0.345 inches, and of a length of substantially the same as a fuel rod, e.g. 16 feet. This length is necessary because the fuel rod puller must extend completely through the fuel assembly section 14 to grasp onto a fuel rod in the latching position 18. The diameter must be sufficiently small to pass through a cell in a fuel assembly grid, and its surface must be free of any kind of projection or obstruction which would otherwise cause the pull rod to hang up on the springs and projections or dimples in a grid cell.

The end of pull rod 22 shown on the left side of FIG. 2 includes a multiplicity of flexible fingers 24 formed by cutting multiple slits 26 axially in a cylindrical tube 28. The base 29 of the tube and its integrally formed fingers are held on a housing or support member 38 through the provision of a flange 31 which bears against a shoulder on the housing. The threaded end 33 on pull rod 22 is screwed onto complementary threads 35 formed on the end of support member 38 until the end 33 abuts the end of tube 28. This action locks tube 28 and its integral spring fingers 24 in a stationary position with respect to other pull rod components. The base 29 of the tube from which each finger projects, is about the same thickness as rod 22 but to impart flexibility to the fingers, a major portion of their length is about half as thick as the base portion. Each finger terminates in an inwardly directed projection 30 shaped to the configuration shown. These fingers are especially designed to grasp the end of a removable guide plug 32 having a bullet-shaped nose 33 and a diameter slightly less than a fuel rod. When a rod puller 17, FIG. 1A is moved through a cell of a fuel assembly grid, the nose 33 on the guide plug serves the function of leading the rod puller past the cell springs and projections without hanging up in the fuel assembly structure.

The removable guide plug includes a groove 36 which receives the leaf spring projections. When these projections are in place as shown, and resting in guide plug groove, the complete rod puller can smoothly move through a grid cell in either direction. When it reaches the latching point 18, (FIG. 1) the guide plug drops off as the leaf springs are opened. Since the end plug welded in a fuel rod is of the same diameter, and is provided with a like groove, the leaf spring projections fit therein to help pull a fuel rod 34 into a fuel assembly.

The central intermediate housing or support cylinder 38 is located in a stationary position in the pull rod 22 and as illustrated in FIG. 2, its outer surface 40 lies in the same circular plane as the outside surface of the fingers 24 in FIG. 2. The support cylinder 38 has a central bore 42 extending the length thereof. It receives a plunger 44 having a pointed end 46 and a piston 48 on the other end. Spring 49 serves to bias the piston and its connected plunger 44 to the right as shown in FIG. 3. Multiple pins 50 slidably mounted in openings 52 in cylinder 38 are designed to push the leaf springs outwardly or into a jaw or leaf spring opening position. One end of the pins 50 carries a head 53 which engages a seat 54 thus preventing the pin from moving inwardly into the cylinder bore 42. The pins are precluded from moving outwardly by the inner surface of the leaf springs 24 which they are designed to engage.

To facilitate the movement of leaf springs 24 into a grasping relationship with an end plug frame 36, the leading edge 56 of each of the leaf springs is machined to about a 45° angle and is complementary to the angle formed on the peripheral edge 58 of the end plug. Finger portions of the pull rod lie adjacent to the end of storage container 10.

OPERATION

In operation, when it is desired to move a fuel rod from the storage container 10 into the grids 14 in fuel assembly section 14 illustrated in FIG. 1, the power source 20 is energized and either multiple or single fuel rod pullers are moved horizontally from section 16 into and through the fuel assembly section 14. The rod puller is led by guide plug 32 through the grid cells until it reaches the latching point 18. As the leaf springs are moved outwardly by the coaction of plunger 44 and pins 50, guide plug 32 falls off, and the rod puller is moved a slight further distance until the leaf spring projections 30 lie next to the end of the plug of a fuel rod to be pulled into grids 14. Continued longitudinal movement of the rod puller will cause the leading edges 56 of the leaf springs to engage the exposed surface of the end plug and thus ride thereover and snap into the groove 36 formed on the end of the fuel rod end plug. Alternatively, the plunger 44 in the fuel rod puller may either remain in contact, or be moved into contact, with the end 60 of the pins and thus force the leaf springs outwardly so that the ends thereof could clear the end plug before being permitted to snap into the groove 36 when the plunger 44 is withdrawn. With the leaf springs in place in the end plug, the power source 20 acts to cause the fuel rod puller to pull the fuel rod 34 to the right as illustrated in FIG. 2 and into the fuel assembly section 14. During the course of pulling the fuel rod into the fuel assembly section, the smooth or uninterrupted outer surfaces of the pull rod 22 and the leaf springs will not hang up on any of the grid springs or dimples (not shown) formed in each cell of a fuel assembly grid through which the fuel rod puller passes. Since the plug end of each fuel rod will be pulled a substantial distance past or beyond the end of the top or last fuel assembly grid, the mechanism 20 can again be energized to cause the plunger 44 and pins 50 to move spring fingers 24 outwardly and thus disengage the spring projections 56 from the end plug groove. Continued pulling movement of pull rod 22 then moves the grasping fingers away from the end plug and as plunger 44 is withdrawn, the leaf springs push the pins 50 back into their original position where the heads 53 engage seat 54 to limit pin inward movement.

Figure 6:
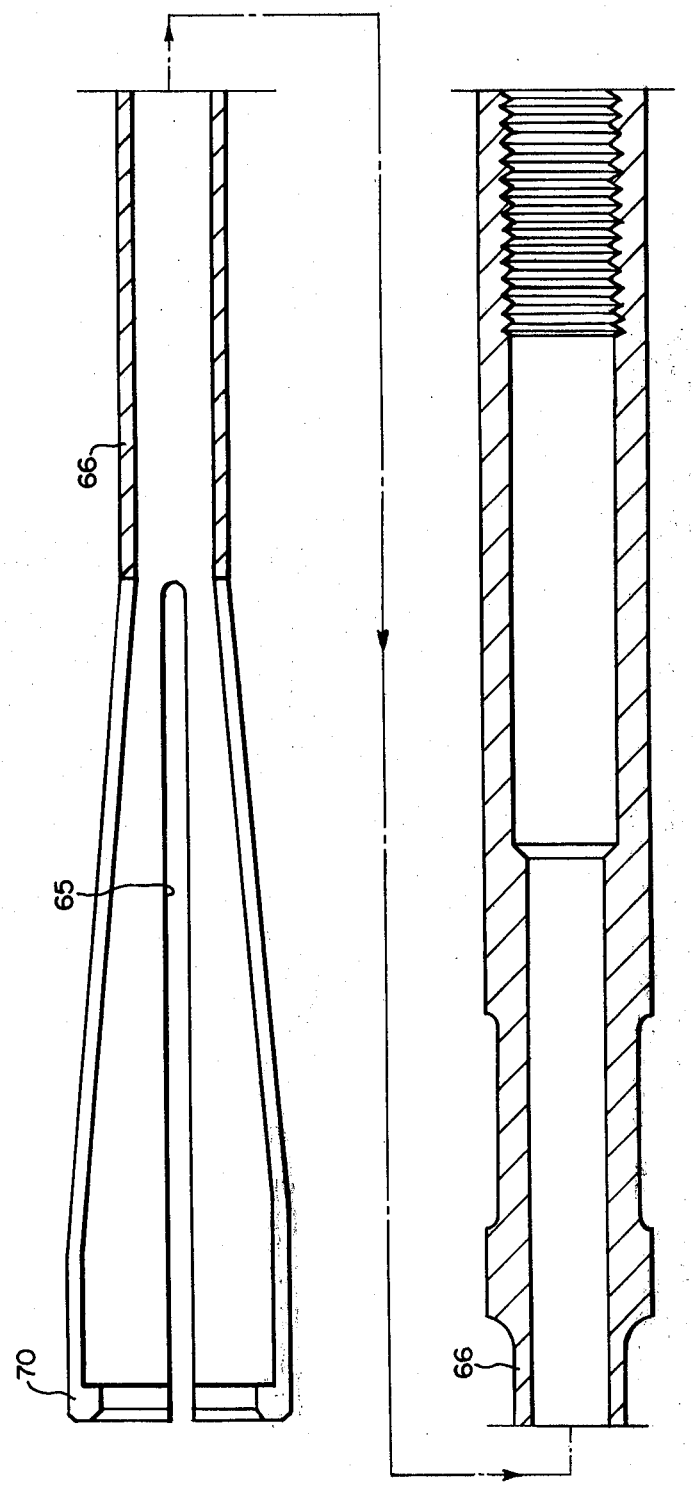
FIG. 6 is a view in elevation, partly in section, illustrating the design of a leaf spring pull rod used in the modified form of FIG. 4.

In the modification illustrated in FIGS. 4-6, the leaf springs 62 as manufactured, are normally biased to an outwardly directed radial position. However, the ends thereof engage groove 36' of end plug 32' when outer tube 64 is moved longitudinally to the left as illustrated in FIG. 4. In the design shown, the outer tube 64 also serves as a housing. The inner pull rod 66 is directly connected to a power source which moves it back and forth along the rod puller length. The outer surface of the rod is smooth with no identations or projections and has a diameter equal to or less than the diameter of a fuel rod. Further, the outer tube 64 encloses along its complete length a collet mechanism including an inner pull rod 66 which remains stationary with respect to the outer tube 64 and a spring loaded plunger 68. The complete rod puller 17, however, is arranged to move through fuel assembly grid cells as in the previous modification.

The grasping portion of the leaf springs formed on the end of inner pull rod 66 are similar to the leaf springs of FIGS. 2 and 3. As shown in FIGS. 5 and 6, the leaf springs are formed by machining slots 65 in the end of inner rod 66 and appropriately forming grasping members 70 on the ends thereof. After the machining process is complete, the leaf springs are placed in a fixture and heat treated to bias them in an outward direction and away from an end plug engaging position. FIG. 5 shows that when the leaf springs are in an engaged position, a space 72 exists between the sides of adjacent leaf springs and this distance is even greater when the leaf springs are in an open or non-engaging position.

That portion 67 of the inner pull rod 66 immediately adjacent the leaf springs has an inner diameter just sufficient to accept the plunger 68. Its outer diameter varies along its length and includes guide area 69 along the rod length. This bushing area coacts with the outer rod to help keep it in alignment and thus obtain uniform compression of leaf springs 62 during operation. The inner diameter of pull rod 66 increases slightly toward the right of FIG. 4 to accommodate a spring 74 and piston 76. The piston 76 is biased by the spring in a direction to the left as shown in FIG. 4. The spring is held in place by the cooperative action of an extension 78 on the piston and a backing member 80.

The inner rod is held stationary with respect to the outer tube 64 and is rigidly attached to the pull rod 66 by an adapter 78, 80, 82. The inner and outer rods are moved relative to each other to open and close the collet puller 66.

Although the inner rod 66 is stationary with respect to outer tube 64 and the plunger 68, the inner rod can nevertheless be adjusted in length to obtain the optimum clamping action of leaf springs 62 in groove 36 on the end of a fuel rod end plug. Adjustment of rod 66 longitudinally of the rod puller changes the point where the outer end 71 of tube 74 contacts the outside surfaces of the leaf springs to move them into engagement with the groove 36. Such adjustment is accomplished by dividing the inner rod 66 into two sections and inserting therebetween an adjustable coupler 79 which includes an adapter 82 joined to one end of the inner rod by screw threads 84. The other end of the adapter includes a shaft 86 having screw threads 88 which is screwed into complementary threads 90 formed on the other separated end of rod 66. To adjust the length of inner rod 66, the adapter 82 with its connected shaft 86 is screwed into inner rod 66 to a point, such as 92, to shorten the total length of rod 66. It is lengthened by rotating adapter 82 in the opposite direction to a point such as indicated at 94. When the correct adjustment is achieved, lock nut 96 locks the part in a set position. As indicated previously, by making such an adjustment, the tube 64 will make contact with the outer sides of the leaf springs at a point which will assure the ends of the leaf springs grasping the end plug in the groove established therein.

In operation, when it is desired to pull a fuel rod 32 into a fuel assembly grid 14, the power source 20 is energized as in the previous modification, and the complete rod puller is moved through the fuel assembly section to point 18 where the leaf springs may grasp onto the end of a fuel rod. During the time the rod puller is being moved through the grids, the ends of leaf springs 62 and the portions 70 thereof will normally rest on the flange 100 formed on the backside of plunger head 98. When in this position, a smooth outer surface with no obstructions is presented to the springs and dimples in the grids as the rod puller passes therethrough thus minimizing the possibility of the pull rod being hung up on any of those parts. When the head 98 approaches the end plug of a fuel rod, the tube 64 is activated in a rearward direction, i.e., to the right as shown in FIG. 4, thus permitting the biased leaf springs to move outwardly out of contact with their seat 100. As the rod puller is advanced forwardly, the plunger head 98 engages the exposed end of the fuel rod end plug and is pushed back to a stop point thus indicating that the grasping jaws of the leaf springs are in a position to engage groove 36. The tube 64 is then activated to a position to the left as shown in FIG. 4, thus causing the leaf springs to be moved inwardly into their groove engaging position. Thereafter, the fuel rod 32 is pulled by the rod puller into the cells in the grids of the fuel assemblies.

It will be apparent that many modifications and variations are possible in light of the above teachings. It therefore is to be understood that within the scope of the appended claims, the invention may be practiced other than as specifically described.

I claim:

1. Apparatus for pulling a fuel rod from a storage container into grids of a nuclear reactor fuel assembly comprising:

a movable rod puller connected to means for longitudinally moving said puller toward the end of a stored fuel rod an end plug sealed in one end of said fuel rod and the axis of said rod being coextensive with the axis of said rod puller;

said rod puller comprising a hollow rod having integrally formed flexible spring members on one end thereof, said spring members being circumferentially spaced from one another;

projections on the end of said spring members, said projections having a configuration complementary to a groove formed in the end of said fuel rod end plug;

means on said rod puller constructed and arranged to coact with said flexible spring members to cause said projections to engage the groove on said end plug;

said rod puller having an outer diameter no greater than the outer diameter of the fuel rod when said projections are latched in the groove of said end plug to thereby permit pulling said fuel rod into a fuel assembly grid; and axially adjustable means on said rod puller arranged to adjust the position of said projections relative to said groove to ensure latching of the spring members in the end plug groove;

whereby as said projections grasp said end plug, activation of said means connected to the rod puller causes it to pull the fuel rod out of said storage container and into said fuel assembly grids.

2. The combination according to claim 1 wherein the means for positioning the projections relative to the groove includes a longitudinally movable cylinder in said hollow rod having an end which abuts the end plug to thereby position the projections in a precise location relative to said groove.

3. The combination according to claim 2 wherein the end of said movable cylinder includes a head having a flange of a size sufficient to receive the projections on said spring members during the time the rod puller is being moved through the fuel assembly grids to the storage area to latch onto a fuel rod.

4. The combination according to claim 1 wherein the hollow rod having flexible spring members is separated along its length, and adjustable means positioned between the separated ends of said hollow rod for adjusting the length of the flexible spring members.

5. The combination according to claim 4 wherein said adjustable means includes an adapter having its opposite ends fitted into the separated ends of the hollow rods so that upon adjusting the adapter, the hollow rod may be varied in length to accurately position the spring member projections relative to the groove in said end plug.

6. The combination according to claim 2 wherein the longitudinally movable cylinder includes an outer surface against which said spring members rest, and means in said hollow rod for biasing said longitudinally movable member toward a fuel rod end plug.

* * * * *